(12) United States Patent
Sato et al.

(10) Patent No.: US 6,764,730 B2
(45) Date of Patent: Jul. 20, 2004

(54) RESIN-COATED METAL PLATE, METAL CAN AND CAN CAP

(75) Inventors: Kazuhiro Sato, Yokohama (JP);
Hiroaki Ikenaga, Yokohama (JP);
Kentaro Ichikawa, Yokohama (JP);
Akihiko Morofuji, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 75 days.

(21) Appl. No.: 10/031,616

(22) PCT Filed: May 18, 2001

(86) PCT No.: PCT/JP01/04187

§ 371 (c)(1),
(2), (4) Date: Jan. 22, 2002

(87) PCT Pub. No.: WO01/87594

PCT Pub. Date: Nov. 22, 2001

(65) Prior Publication Data

US 2003/0118811 A1 Jun. 26, 2003

(30) Foreign Application Priority Data

May 19, 2000 (JP) .......................................... 2000-147980
Jun. 15, 2000 (JP) .......................................... 2000-180343

(51) Int. Cl.⁷ ............................................... B32B 15/08
(52) U.S. Cl. ..................... 428/35.8; 428/34.1; 428/457; 428/458; 428/461
(58) Field of Search ................................ 428/457, 458, 428/461, 34.1, 35.8

(56) References Cited

U.S. PATENT DOCUMENTS 6,071,599 A * 6/2000 Kosuge et al. ............... 428/213
6,099,924 A * 8/2000 Nakamaki et al. ......... 428/35.8

FOREIGN PATENT DOCUMENTS

| JP | 4-25455 A | 1/1992 |
| JP | 7-138387 A | 5/1995 |
| JP | 7-195617 A | 8/1995 |
| JP | 7-207039 A | 8/1995 |
| JP | 7-276564 A | 10/1995 |
| JP | 7-2852031 A | 10/1995 |
| JP | 11-235784 A | 8/1999 |

OTHER PUBLICATIONS

International Search Report for PCT/JP01/04187 dated Aug. 21, 2001.

* cited by examiner

Primary Examiner—Monique R. Jackson
(74) Attorney, Agent, or Firm—Sughrue Mion, PLLC

(57) ABSTRACT

A resin-coated metal sheet comprising a metal substrate and a thermoplastic resin layer formed on the surface of the metal substrate, wherein the thermoplastic resin layer comprises a polyester consisting chiefly of a polyethylene terephthalate and an ethylene polymer, and contains an ionomer resin as well as a tocopherol or a derivative thereof. The resin-coated metal sheet exhibits corrosion resistance, shock resistance (dent resistance) and resistance against high temperature and humidity, and withstands the retort-sterilization and the aging in a hot vendor or the like after the retort-sterilization.

6 Claims, 2 Drawing Sheets

RESIN-COATED METAL PLATE, METAL CAN AND CAN CAP

TECHNICAL FIELD

The present invention relates to a resin-coated metal sheet obtained by laminating a film of a polyester composition on a metal substrate. More specifically, the invention relates to a resin-coated metal sheet having excellent shock resistance (dent resistance), resistance against high temperature and humidity, corrosion resistance, adhesiveness and workability, and to a metal can and a can closure made by using the above resin-coated metal sheet having the above properties.

BACKGROUND ART

A side-seamless can has heretofore been produced by subjecting a metal blank such as an aluminum plate, a tin plate or a tin-free steel plate to at least one step of draw working between a drawing die and a punch to obtain a cup which includes a barrel without seam on the side surface thereof and a bottom integrally connected to the barrel without seam, and, as required, by subjecting the barrel to the ironing or to the bend-elongation working to decrease the thickness of the side wall.

As a method of coating the side-seamless can with an organic film, there has been known a method of laminating a resin film on the metal blank prior to the molding. For example, Japanese Unexamined Patent Publication (Kokai) No. 172556/1994 discloses laminating a polyester film having a limiting viscosity [η] of not smaller than 0.75 on a metal.

It is an accepted practice to blend the polyester with an antioxidizing agent or a reforming component in order to improve the heat resistance and the shock resistance of the polyester used as a resin coating. For example, Japanese Unexamined Patent Publication (Kokai) No. 138387/1995 discloses a polyester film for lamination on a metal, comprising a polyester composition which contains an antioxidizing agent in an amount of from 0.01 to 5% by weight, and Japanese Unexamined Patent Publication (Kokai) No. 207039/1995 discloses a polyester film for lamination on a metal sheet having a melting point of from 120 to 260° C., and containing from 0.01% to 1% by weight of a diethylene glycol component and from 0.001 to 1% by weight of an antioxidizing agent.

The side-seamless can is produced by subjecting a resin-coated metal sheet which is obtained by coating in advance, a metal blank with an organic film, to the draw working or to the bend-elongation working. However, the organic coating on the inner surface is likely to be damaged by a tool in the step of working. In the portions where the coating is damaged, the metal is exposed actually or latently, and elutes out or corrodes from these portions. In producing the seamless cans, there takes place a plastic flow in which the size increases in the direction of height of the can and the size contracts in the circumferential direction of the can. When the plastic flow takes place, the adhering force decreases between the surface of the metal and the organic coating and, besides, the adhering force between the two decreases with the passage of time due to residual strain in the organic coating. Such a tendency becomes conspicuous particularly when the content is packaged while it is hot or when the canned content is heat-sterilized at a low temperature or at a high temperature.

Further, the dent resistance is a real shock resistance that is required for the canned products. This is such a property that the adhesiveness and coverage of the coating are still completely maintained even when the canned product is dented as represented by a mark of hit like when the canned product is fallen or when the canned products come into collision with each other. That is, when the coating is peeled or when the coating develops pinholes or cracks in the denting test, the leakage occurs from these portions due to the elution of metal or pitting, and the content is no longer preserved. In general, the polyester which exhibits excellent resistance against the content, lacks the property of absorbing or relaxing the shock at the time of denting test, and imparting this property becomes an important assignment.

Further, the cans for packaging the content are usually printed on the outer peripheral surfaces thereof, and the polyester film is affected by the heat of firing the printing ink. In practically producing the cans, further, the cans are often heated in order to stabilize the resin coating by removing the strain therefrom. The effect of this heating upon the polyester is not negligible. The polyester tends to be thermally deteriorated, i.e., loses the molecular weight by heating accompanied by a decrease in the dent resistance, in the adhesiveness to the metal substrate, in the coating property, and in the workability at the time of necking and wrap-seam working.

In order to improve the dent resistance after thermally deteriorated at such high temperatures, Japanese Unexamined Patent Publication (Kokai) No. 19183/1998 discloses a resin layer applied onto a metal substrate, i.e., discloses a laminate of a polyester or a polyester composition comprising:

a polyester segment derived from (I) a polyethylene terephthalate segment and (II) a butylene glycol and an aromatic dibasic acid;

a polyester segment derived from (III) a butylene glycol and an aliphatic dibasic acid; and at least one non-sulfur antioxidizing agent having a molecular weight of not smaller than 400 in an amount of from 0.01 to 1.5 parts by weight per 100 parts by weight of the polyester or the polyester composition.

The can comprising the above-mentioned laminate exhibits markedly improved dent resistance after put to the thermal hysteresis at a high temperature, but is not still capable of offering satisfactory corrosion resistance or shock resistance when placed under high temperature and humidity conditions such as during the retort-sterilization or when put to the hot vendor.

Further, Japanese Unexamined Patent Publication (Kokai) No. 195617/1995 discloses a resin-coated metal sheet having, on both surfaces or on one surface of a metal sheet, a film of a resin composition comprising 1 to 25 parts by weight of an ionomer resin, and 75 to 95 parts by weight of a saturated polyester resin which is a compound derived from a dicarboxylic acid and a hydroxy compound and in which, when the dicarboxylic acid component is 100 mol %, the dicarboxylic acid component comprises 50 to 95 mol % of a terephthalic acid and 50 to 5 mol % of an isophthalic acid and/or an orthophthalic acid, and the dihydroxy component is chiefly an ethylene glycol. This resin-coated metal sheet exhibits excellent flavor-retaining property yet exhibiting excellent shock resistance and adhesiveness.

According to the above prior art, however, a particular polyester resin must be prepared. Since the isophthalic acid is fairly expensive, therefore, it is desired to obtain a high degree of shock resistance and adhesiveness as well as flavor-retaining property even when a cheaply available general-purpose polyester resin is used.

If the general-purpose polyester resin is blended with the ionomer resin, further, there occurs a new technical assignment in that lumps are formed due to coagulation of the ionomer resin.

It has further been desired to improve the adhesiveness of the resin coating layer onto the metal substrate and to improve the workability to cope with the production of cans at high speeds. It is further an important technical assignment to improve the resistance against high temperatures and humidity to cope with the retort-sterilization and the subsequent aging even when the content is acidic and is strongly corrosive, to improve the shock resistance after the retort-sterilization, and to improve the corrosion resistance after the retort-sterilization or after having received the shocks.

DISCLOSURE OF THE INVENTION

It is an object of the present invention to provide a resin-coated metal sheet having corrosion resistance, shock resistance (dent resistance) and resistance against high temperature and humidity, which is capable of withstanding the retort-sterilization and the aging in a hot vendor after the retort-sterilization.

It is another object of the present invention to provide a resin-coated metal sheet featuring improved film-forming property, excellent workability, and satisfying a flavor-retaining property required for the cans, by using a general-purpose polyester resin, exhibiting adhesiveness even without using the primer, and making it possible to decrease the cost of production.

It is a further object of the present invention to provide metal cans and can closures having these properties.

According to the present invention, there is provided a resin-coated metal sheet comprising a metal substrate and a thermoplastic resin layer formed on the surface of the metal substrate, wherein the thermoplastic resin layer comprises a polyester consisting chiefly of a polyethylene terephthalate and an ethylene polymer, and contains a tocopherol or a derivative thereof in an amount of from 0.05 to 3% by weight.

In the resin-coated metal sheet of the present invention, it is desired that:
1. The polyester and the ethylene polymer are contained at a weight ratio of from 95:5 to 50:50;
2. The ethylene polymer contains an ionomer;
3. The coated layer has a melt viscosity of from 2000 to 10,000 centipoises at a temperature of 260° C. and at a shearing rate of 122 sect, the thermoplastic polyester in the coated layer has an inherent viscosity (IV) in a range of from 0.6 to 1.5, and the ionomer resin in the coated layer is existing as a dispersion phase having an average particle diameter of not larger than 5 µm;
4. The ionomer resin in the coated layer contains zinc as a metal seed; and
5. The coated layer is blended with a novolak resin of a bifunctional phenol.

According to the present invention, further, there is provided a metal can which is so formed that the resin-coated metal sheet becomes the inner surface of the can.

According to the present invention, further, there is provided a metal closure which is so formed that the resin-coated metal sheet is on the inner surface side of the can.

BEST MODE FOR CARRYING OUT THE INVENTION

In the resin-coated metal sheet of the present invention, an importance resides in that a polyester comprising chiefly a polyethylene terephthalate is combined with an ethylene polymer, and this polyester composition is blended with a tocopherol or a derivative thereof in an amount of from 0.05 to 3% by weight to form a resin coating. Due to this, the resin-coated metal sheet is imparted with excellent corrosion resistance, shock resistance and resistance against high temperature and humidity. Even when the resin-coated metal sheet is placed under severe conditions such as of retort-sterilization or in a hot vendor, the above-mentioned properties are maintained creating an important feature of the invention.

It has been known already that the tocopherol with which is blended the polyester composition of the polyester consisting chiefly of a polyethylene terephthalate and an ethylene polymer, works as an antioxidizing agent to improve the dent resistance by preventing a decrease in the molecular weight that is caused by the degradation at the time of heat-treating the polyester resin. When the polyester composition of the polyester consisting chiefly of a polyethylene terephthalate and an ethylene polymer, is blended with the tocopherol according to the present invention, not only the dent resistance is improved but also corrosion is prevented even in case the film is cracked under severe conditions of retort-sterilization and in the hot vendor. Namely, corrosion resistance is markedly improved, which is a new and unexpected effect.

That is, as will become obvious from the results of Examples appearing later, when the can walls of the resin-coated metal sheets are put to the cross-cut testing, corrosion does not almost proceed in the case of the can wall of the resin-coated metal sheet of the present invention, proving markedly improved corrosion resistance.

Figure 1:
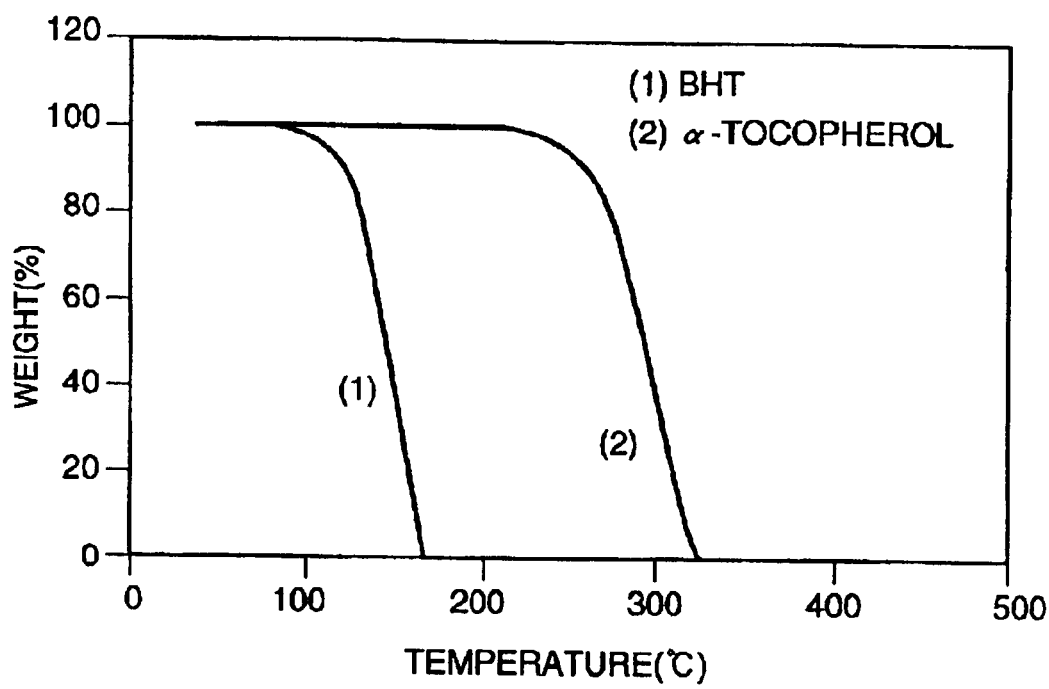
FIG. 1 is a diagram illustrating the thermal degradation of a tocopherol used in the present invention.

The tocopherol or a derivative thereof used in the present invention is little degraded and features excellent heat resistance as will be understood from the fact that it is holding a weight of not smaller than 80% at a temperature of 260 to 270° C. at which the polyethylene terephthalate is worked as shown in FIG. 1. Therefore, the polyethylene terephthalate which is blended with the tocopherol exhibits its excellent effect. Besides, the tocopherol (vitamin E) poses no harm even in case it elutes out into the content, and maintains excellent sanitary properties.

The ethylene polymer serving as a reforming agent with which the polyester consisting chiefly of the polyethylene terephthalate is blended, works to improve the shock resistance of the polyester, to improve adhesiveness to the metal sheet, to improve workability, and makes it possible to form a homogeneous resin coating on the metal sheet. The ethylene polymer, however, tends to be scorched by heating. When the polyester is blended with the ethylene polymer alone, lumps are formed to hinder the formation of the film. By blending the polyester composition of the polyester consisting chiefly of the polyethylene terephthalate and the ethylene polymer with the tocopherol in an amount of from 0.05 to 3% by weight as contemplated by the present invention, it is made possible to suppress the scorching of the ethylene polymer and to favorably form the film.

Figure 2:
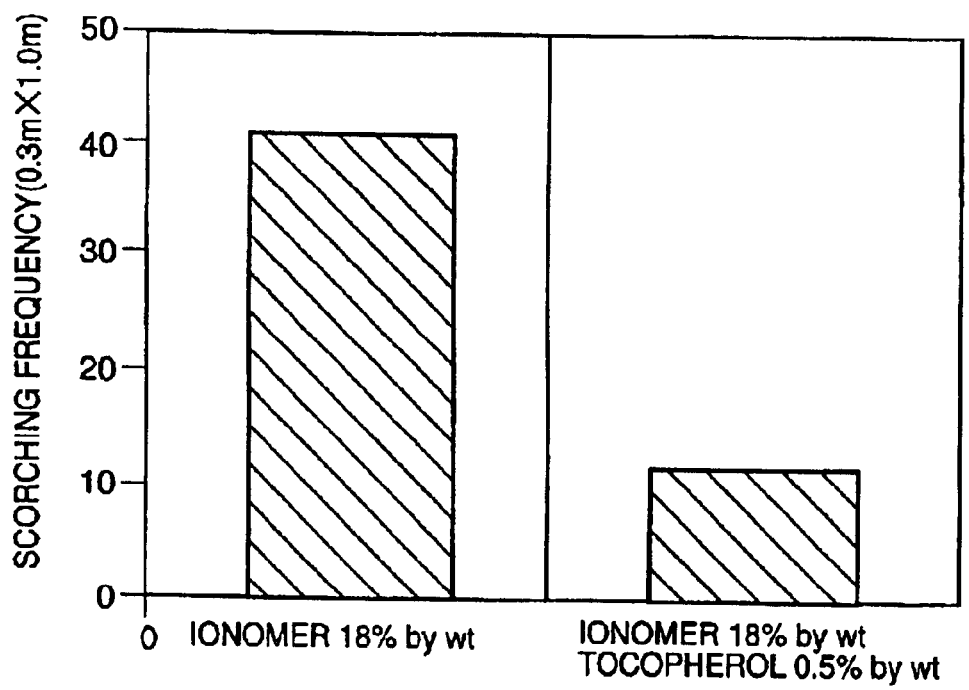
FIG. 2 is a diagram illustrating the effect of suppressing the scorching of tocopherol used in the present invention.

That is, as shown in FIG. 2, when the polyester obtained by blending the polyethylene terephthlate with 18% by weight of the ionomer resin as the ethylene polymer is compared with the polyester obtained by blending the polyethylene terephthalate with 18% by weight of the ionomer resin and 0.5% by weight of the tocopherol, the frequency of scorching of the polyester drastically decreases when the tocopherol is blended. This is attributed to that the tocopherol itself is oxidized preventing the ionomer from being oxidized.

In the present invention, too, the tocopherol serving as an antioxidizing agent effectively suppresses the drop of molecular weight of the polyethylene terephthalate that is caused by the thermal degradation.

Figure 3:
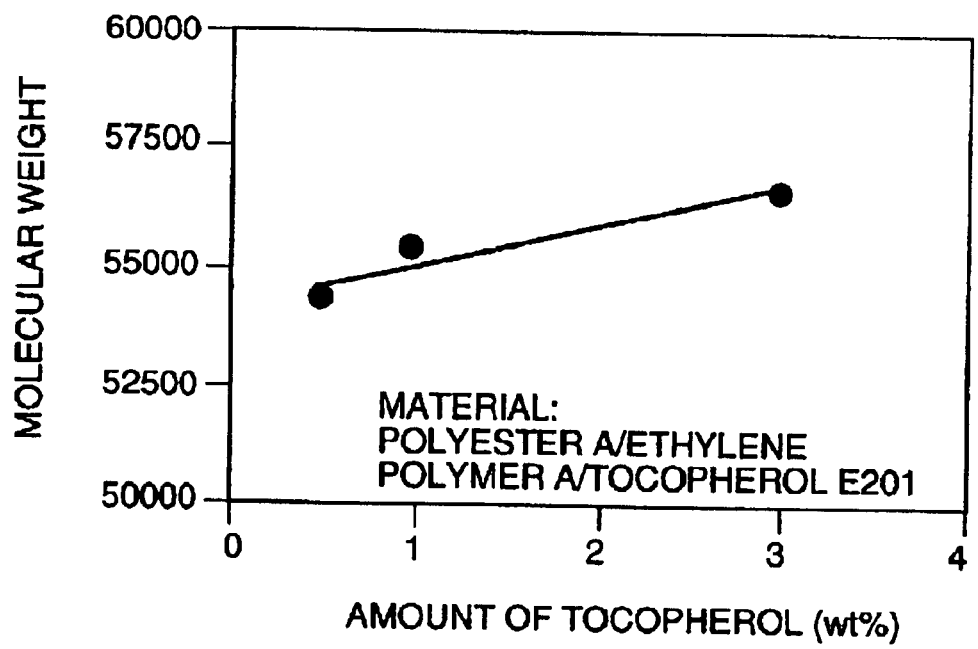
FIG. 3 is a diagram illustrating the effect of the tocopherol used in the present invention upon the molecular weight of PET.

Referring to FIG. 3, when the polyester composition of the polyethylene terephthalate and the ethylene polymer is heated while changing the amount of addition of tocopherol (molecular weight of before being heated: 58000), a drop in the molecular weight is suppressed when the tocopherol is added in large amounts. Upon adding the tocopherol in a predetermined amount as described above, it is made possible to effectively prevent a drop in the molecular weight of the polyester caused by the thermal degradation and to improve the dent resistance.

According to the present invention, it is necessary that the tocopherol or a derivative thereof is contained in the polyester composition in an amount of from 0.05 to 3% by weight and, particularly, from 0.1 to 2% by weight. When the amount is smaller than the above range, the above-mentioned excellent effect obtained from the tocopherol or the derivative thereof is not exhibited to a sufficient degree for the polyester composition. When the amount is larger than the above range, on the other hand, the polyester is gelled, and the film loses smoothness, making it difficult to obtain a seamless can.

In the resin-coated metal sheet of the present invention, further, the ionomer resin is used as the ethylene polymer, the coated layer of resin has a melt viscosity of from 2000 to 10,000 centipoises at a temperature of 260° C. and at a shearing rate of 122 $sec^{-1}$, the thermoplastic polyester in the coated layer has an inherent viscosity (IV) in a range of from 0.6 to 1.5, and the ionomer resin in the coated layer is existing as a dispersion phase having an average particle diameter of not larger than 5 $\mu$m.

In the resin-coated metal sheet, the ionomer resin is not compatible with the thermoplastic polyester resin but coagulates in the polyester resin and exists as a dispersion phase having an average particle diameter of not larger than 5 $\mu$m. Therefore, excellent properties such as toughness and abrasion resistance of the ionomer resin are not lost but are exhibited in the coated resin. Even when a general-purpose polyester resin is used in combination as a matrix, therefore, it is allowed to impart the shock resistance (particularly, dent resistance), adhesiveness and corrosion resistance to the general-purpose polyester resin which constitutes the matrix.

The present inventors have discovered through experiment that the particle diameter of the dispersion phase of the ionomer resin takes part in the dent resistance as is obvious from the results of Examples appearing later though the reason is not clear yet. That is, when the average particle diameter of the dispersion phase is smaller than 5 $\mu$m (Example 18), the average electric current by flat sheet dents that represents the dent resistance is about 0.3 mA. When the average particle diameter is larger than 5 $\mu$m (Comparative Examples 7 and 8), on the other hand, the average electric current is about 3.0 mA which is a striking decrease in the dent resistance.

In order to decrease the average particle diameter of the dispersion phase of the ionomer resin to be smaller than 5 $\mu$m, further, it is important that the inherent viscosity (IV) of the thermoplastic polyester in the coated layer lies in a range of from 0.6 to 1.5 and, particularly, from 0.65 to 1.2. That is, when the inherent viscosity is smaller than the above-mentioned range, the ionomer resin is not homogeneously dispersed in the polyester and the particle diameter of the dispersion becomes larger than the above-mentioned range. When the inherent viscosity is larger than the above-mentioned range, on the other hand, the effect, i.e., the dent resistance is not exhibited to a sufficient degree despite the ionomer resin is dispersed in the coated layer.

Further, the inherent viscosity that lies within the above-mentioned range is important from the standpoint of improving corrosion resistance after the retort-sterilization. That is, the polyester such as the polyethylene terephthalate is deteriorated by the treatment under the conditions of a high temperature and a high humidity after the retorting being caused by the fact that the polyester is hydrolyzed and degraded under such conditions, and the thermal crystallization is promoted by a reduction in the molecular weight. Upon confining the inherent viscosity of the thermoplastic polyester resin in the coated layer to lie within the above-mentioned range, however, it is allowed to improve the barrier property against the corrosive components after retorting and to improve the mechanical properties thereby to improve the corrosion resistance (retort resistance) after the retorting.

In order to suppress the average particle diameter of the dispersion phase of the ionomer resin to be not larger than 5 μm, further, it is important that the coated layer has a melt viscosity in a range of from 2000 to 10000 centipoises and, particularly, from 3000 to 8000 centipoises at a temperature of 260° C. and at a shearing rate of 122 sec$^{-1}$. That is, when the melt viscosity is smaller than the above-mentioned range, the resin is not kneaded to a sufficient degree, the ionomer resin is not homogeneously dispersed, and the diameters of the dispersed particles become too large. Further, when the melt viscosity is larger than the above-mentioned range, the extrusion characteristics are deteriorated.

The fact that the melt viscosity lies within the above-mentioned range is important from the standpoint of workability, dent resistance, film-forming property and, particularly, from the standpoint of preventing the formation of lumps. That is, when the melt viscosity is smaller than the above-mentioned range, the film-forming property is deteriorated due to the formation of lumps and the dent resistance is not exhibited to a sufficient degree. When the melt viscosity is not smaller than the above-mentioned range, on the other hand, the workability is deteriorated.

Polyester

According to the present invention, the polyester consisting chiefly of a polyethylene terephthalate can be preferably used. That is, the polyester consisting chiefly of a polyethylene terephthalate is the one in which not less than 50 mol % of the aromatic carboxylic acid component is a terephthalic acid component and not less than 50% of the alcohol component consisting chiefly of an aliphatic diol is an ethylene glycol component.

So far as the above-mentioned conditions are satisfied, the polyester may be a homopolyester, a copolymerized polyester, or a blend of two or more kinds thereof.

As the carboxylic acid component other than the terephthalic acid component, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid and pyromellitic acid.

As the alcohol component other than the ethylene glycol, on the other hand, there can be exemplified such alcohol components as propylene glycol, 1,4-butanediol, neopentyl glycol, 1,6-hexylene glycol, diethylene glycol, triethylene glycol, cyclohexanedimethanol, bisphenol A ethylene oxide adduct, glycerol, trimethylolpropane, pentaerythritol, dipentaerythritol and sorbitan.

The polyester must have a molecular weight large enough for forming a film. It is desired that the polyester has an inherent viscosity [η] of not smaller than 0.5 and, particularly, in a range of from 0.6 to 1.5 as measured by using a mixed solvent of phenol/tetrachloroethane as a solvent from the standpoint of barrier property against the corrosive components and mechanical properties.

Ethylene Polymer

As the ethylene polymer which is a reforming agent for the polyester of the present invention, there can be exemplified low-, medium- or high-density polyethylene, linear low-density polyethylene, linear ultralow-density polyethylene, ethylene-propylene copolymer, ethylene-butene-1 copolymer, ethylene-propylenebutene-1 copolymer, ethylene-vinyl acetate copolymer, ionically crosslinked olefin copolymer (ionomer) and ethylene-acrylic acid ester copolymer.

Among them, the ionomer resin that will be described below can be preferably used.

Ionomer Resin

The ionomer resin is an ionic salt in which part or whole of the carboxyl groups in the copolymer of an ethylene and an α,β-unsaturated carboxylic acid, is neutralized with metallic cations, and its physical properties are affected by the degree of neutralization, i.e., by the concentration of ions. In general, the melt flow rate (hereinafter simply referred to as MFR) of the ionomer resin is affected by the concentration of ions, and decreases with an increase in the concentration of ions. Further, the melting point is affected by the concentration of the carboxyl groups and decreases with an increase in the concentration of the carboxylic groups.

Therefore, though not limited thereto only, it is desired that the ionomer resin used in the present invention has the MFR of not larger than 15 g/10 min. and, particularly, in a range of from 5 g/10 min. to 0.5 g/10 min., and has a melting point of not higher than 100° and, particularly, in a range of from 97° C. to 80° C.

As the α,β-unsaturated carboxylic acid constituting the ionomer resin, there can be exemplified unsaturated carboxylic acid having 3 to 8 carbon atoms or, concretely, acrylic acid, methacrylic acid, maleic acid, itaconic acid, maleic anhydride, monomethyl ester maleate and monoethyl ester maleate.

As a preferred base polymer, in particular, there can be exemplified ethylene-(meth)acrylic acid copolymer and ethylene-(meth)acrylic acid ester-(meth)acrylic acid copolymer.

As the metal ions for neutralizing the carboxyl group in the copolymer of the ethylene and the α,β-unsaturated carboxylic acid, there can be exemplified Na$^+$, K$^+$, Li$^+$, Zn$^+$, Z$^{2+}$, Mg$^{2+}$, Ca$^{2+}$, Co$^{2+}$, Ni$^{2+}$, Mn$^{2+}$, Pb$^{2+}$ and Cu$^{2+}$. According to the present invention, the copolymer neutralized with zinc can be particularly preferably used owing to its large degree of crosslinking and small susceptibility to humidity. Further, the remaining carboxyl groups that are not neutralized with metal ions may be partly esterified with a lower alcohol.

In the resin-coated metal sheet of the second embodiment of the present invention as described above, it is important that the ionomer resin is existing as a dispersion phase having an average particle diameter of not larger than 5 μm and, particularly, in a range of from 0.1 to 3.0 μm in the polyester resin which is a matrix. When the ionomer resin dispersed in the polyester is dissolved with a solvent such as xylene, traces after the ionomer has eluted out can be observed through a microscope. Upon measuring the diameters of the traces, it is allowed to measure the particle diameter of the dispersion phase of the ionomer resin.

In the present invention, it is desired that the ratio of the polyester and the ethylene polymer is in a range of from 95:5 to 50:50 and, particularly, from 90:10 to 70:30. When the amount of the ethylene polymer is smaller than the above range, the polyester may not be reformed with the ethylene polymer to a sufficient degree, i.e., shock resistance, adhesiveness to the metal sheet and workability of the polyester may not be improved to a sufficient degree, and the resin coating may not be homogeneously formed on the metal sheet. When the amount of the ethylene polymer is larger than the above range, on the other hand, there may be formed lumps, gel and fisheyes, making it difficult to form the resin-coating on the metal sheet maintaining a constant thickness. Besides, pinholes may develop during the working.

It is desired that the ionomer resin used in the present invention contains a constituent unit derived from the ethylene in an amount of from 80 to 99 mol % and, preferably, from 85 to 96 mol % and contains a constituent unit derived from the unsaturated carboxylic acid in an amount of from 1 to 20 mol % and, preferably, from 4 to 15 mol %.

Tocopherol and its Derivatives

The tocopherol (vitamin E) used in the present invention is represented by the following general formula (I),

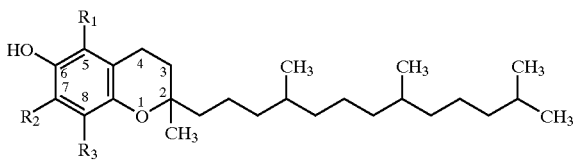

(1)

Preferred examples include α-tocopherol represented by the above formula (1) in which $R_1=R_2=R_3=CH_3$, β-tocopherol of the above formula (1) in which $R_1=R_3=CH_3$, $R_2=H$, γ-tocopherol of the above formula (1) in which $R_2=R_3=CH_3$, $R_1=H$, and δ-tocopherol of the above formula (1) in which $R_3=CH_3$, $R_1=R_2=H$.

In the above formula (1), further, there may be substituted any optical isomer d- or l-concerning the asymmetric carbon atom at the second position; i.e., there can be used either a natural compound (d-type tocopherol) or a synthetic compound (dl-type tocopherol). Among them, the α-tocopherol can be effectively used.

Novolak Resin of Bifunctional Phenol

In the present invention, it is desired to use a novolak resin (novolak-type phenol resin) of a bifunctional phenol as a resin-reforming agent. The polyester film blended with the novolak-type phenol resin maintains excellent adhesiveness and corrosion resistance even after subjected to severe mechanical working and heat treatment. This film further exhibits excellent resistance against high temperatures and humidities even after the passage of time under high-temperature and humidity conditions of after the retort-sterilization. As described earlier, the polyester such as the polyethylene terephthalate is deteriorated by the treatment under the conditions of a high temperature and a high humidity after the retorting being caused by the fact that the polyester is hydrolyzed and degraded under such conditions, and the thermal crystallization is promoted by a reduction in the molecular weight. Upon blending the polyester with a small amount of phenol resin, however, it is allowed to suppress the degradation of the polyester caused by the hydrolysis and to markedly suppress the deterioration of the coated layer of resin.

The novolak-type phenol resin used in the present invention is obtained by a known method, i.e., by reacting phenols with a formaldehyde or a functional derivative thereof in the presence of an acidic catalyst and water.

Though there is no particular limitation on the phenols that are used, there are preferably used monocyclic and monovalent phenols and, particularly, bifunctional phenols represented by the following formula (1),

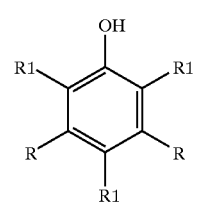

(1)

wherein R1 is a hydrogen atom, an alkyl group or an alkoxy group having not more than 4 carbon atoms, and wherein two of three R1s are hydrogen atoms, and the remaining one is an alkyl group or an alkoxy group, and R is a hydrogen atom or an alkyl group having not more than 4 carbon atoms, such as o-cresol, p-cresol, p-tert butylphenol, p-phenylphenol, p-ethylphenol, 2,3-xylenol and 2,5-xylenol, which can be used in one kind or in two or more kinds as chief components.

On the other hand, the formaldehyde that is used for the reaction is the one that is generally available as a formaline solution. As the functional derivative of the formaldehyde, on the other hand, there can be exemplified paraformaldehyde and trioxane.

As the acid catalyst, there can be used hydrochloric acid, sulfuric acid, phosphoric acid, toluenesulfonic acid, oxalic acid and lactic acid. Though there is no particular limitation, the formaldehyde is used for the phenols in an amount that has heretofore been used for the production of the novolak resin, e.g., in an amount of from 0.8 to 1 mol per mol of the phenols. The reaction is usually conducted by heating the reaction system while it is refluxed, and the formed resin is put to the treatments such as dehydration, neutralization, washing and refining, and is recovered as a solid resin component.

In the present invention, it is desired that the phenol resin is blended in an amount of from 0.05 to 25% by weight and, particularly, from 0.1 to 15% by weight per 100% by weight of the polyester. When the blending ratio of the phenol resin is smaller than the above range, the resistance against high temperature and humidity and the shock resistance are not improved to a sufficient degree as compared to when the blending ratio lies within the above range. When the blending ratio of the phenol resin exceeds the above range, on the other, the flavor-retaining property tends to be deteriorated.

According to the present invention, further, the polyester composition can be blended with known blending agents for resins, such as anti-blocking agent like amorphous silica, pigment like titanium dioxide, various antistatic agents and lubricants according to known recipe.

The polyester resin is blended with the ethylene polymer (particularly, ionomer resin) and, further, with a reforming agent such as phenol resin or tocopherol by dry-blending or melt-blending depending upon the properties of the ionomer resin. In the former case, the resin is mixed by using a blender, Henschel's mixer or super-mixer, and is directly supplied into a hopper of an extruder. In the latter case, the resin is kneaded by using a monoaxial or biaxial extruder, kneader or Bumbury's mixer. In either one of these cases, the polyester and the ionomer resin are finally blended together at a temperature not lower than the melting point of the polyester. It is further allowable to prepare a master butch containing the ionomer resin at a relatively high concentration, and with which the polyester may be blended.

The coated layer of the blend of the polyester resin and the ionomer resin must have been kneaded by the above-mentioned method so as to possess a melt viscosity of from 2000 to 10000 centipoises and, particularly, from 3000 to 8000 centipoises at a temperature of 260° C. and at a shearing rate of 122 $sec^{-1}$.

The thermoplastic polyester resin exhibits a viscosity that decreases drastically due to the thermal decomposition as it is kneaded. It is therefore important that the thermoplastic polyester resin is blended with the ionomer resin in such a manner that the melt viscosity of the coated layer lies within the above-mentioned range, so that the thermoplastic polyester resin in the coated layer maintains an inherent viscosity over a range of from 0.6 to 1.5, and that the ionomer resin possesses an average particle diameter of not larger than 5 $\mu$m and is homogeneously dispersed in the thermoplastic polyester resin.

Metal Sheet

As the metal sheet used in the present invention, there can be used a variety kinds of surface-treated steel plates and a light metal sheet such as of aluminum. As the surface-treated steel plate, there can be used the one obtained by annealing a cold-rolled steel plate, subjecting it to a secondary cold rolling and, then, to one or two or more kinds of surface treatments such as zinc plating, tin plating, nickel plating, electrolytic treatment with chromic acid and treatment with chromic acid. There can be further used an aluminum-coated steel plate which is plated with aluminum or obtained by rolling aluminum.

As the light metal sheet, there is used a so-called pure aluminum plate and an aluminum alloy plate.

The initial thickness of the metal sheet may differ depending upon the kind of metal, use of the container or size of the container. Generally, however, the metal sheet has an initial thickness of from 0.10 to 0.50 mm. Among them, the surface-treated steel plate may have a thickness of from 0.10 to 0.30 mm and the light metal sheet may have a thickness of from 0.15 to 0.40 mm.

Resin-coated Metal Sheet and its Preparation

In the resin-coated metal sheet of the present invention, the polyester film formed on the metal substrate may a layer comprising the above-mentioned polyester composition alone, or may be a layer of a laminate with at least another polyester layer. In the case of the latter laminate, it is important that the polyester composition (hereinafter often simply referred to as polyester composition) containing the ethylene polymer and the tocopherol is at least present on a side that comes into contact with the metal substrate from the standpoint of corrosion resistance, resistance against high temperature and humidity and shock resistance.

Figure 4:
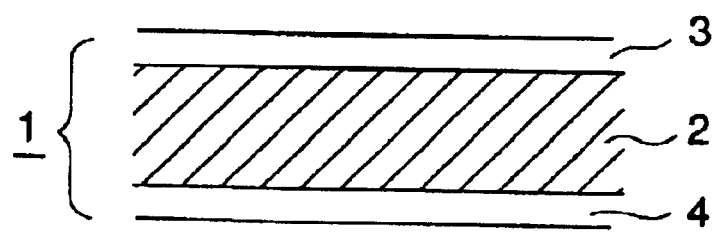
FIG. 4 is a diagram illustrating a sectional structure of a resin-coated metal sheet of the present invention.

FIG. 4 is a diagram illustrating a sectional structure of the resin-coated metal sheet of the present invention. The resin-coated metal sheet 1 comprises a metal substrate 2, and a layer 3 of a polyester composition containing an ethylene polymer and a tocopherol formed on the side that becomes the inner surface when a container is molded. A thermoplastic polyester layer 4 is formed on the outer surface of the container of the metal substrate 2. The polyester layer on the outer surface may comprise a polyester composition or any other polyester.

Figure 5:
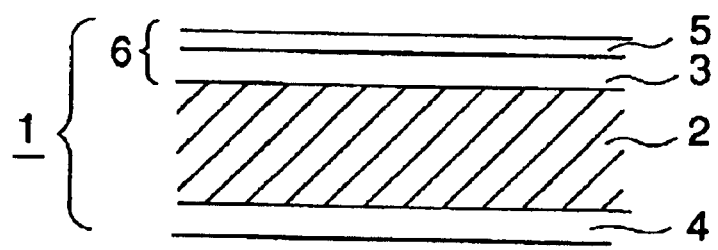
FIG. 5 is a diagram illustrating another sectional structure of the resin-coated metal sheet of the present invention.

Referring to FIG. 5 illustrating another resin-coated metal substrate, a laminated resin layer 6 is formed on the inner surface of the container, including an underlying layer 3 of a polyester composition on the side that comes in contact with the metal substrate and a polyester surface layer 5. In other respects, the resin-coated metal substrate is the same as the one shown in FIG. 4.

In the present invention, it is desired that the polyester layer has a thickness of from 1 to 60 $\mu$m and, particularly, from 2 to 40 $\mu$m as a whole from the standpoint of balance between protecting the metal substrate and the workability. In the case of the laminated layer, on the other hand, it is desired that the layer of the polyester composition containing the ethylene polymer and the tocopherol and the other polyester layer have a thickness of from 1:40 to 40:1 and, particularly, from 1:20 to 20:1 from the standpoint of corrosion resistance and balance between the resistance against high temperature and humidity and the shock resistance.

According to the present invention, the polyester layer can be formed on the metal substrate by any means such as extrusion coating method, cast-film heat-adhesion method, or biaxially stretched film heat-adhesion method.

In the case of the extrusion coating method, the extruders are used in a number corresponding to the kinds of resins, the polyester is extruded through a die and the metal substrate is extrusion-coated with the polyester of a molten state so as to be heat-adhered thereon. The polyester composition is heat-adhered onto the metal substrate by utilizing the amount of heat possessed by the molten polyester layer and the amount of heat possessed by the metal sheet. The metal sheet is heated usually at a temperature of from 90 to 290° C. and, particularly, from 100 to 280° C.

When the polyester film is to be used, it is molded by the T-die method or by the inflation film-forming method. There can be used an unstretched film obtained by the cast-molding method, i.e., by quickly quenching the film that is extruded. There can be further used a biaxially stretched film obtained by biaxially stretching the film successively or simultaneously at a stretching temperature and, then, heat-setting the film after it has been stretched.

In the resin-coated metal sheet of the present invention, the polyester film can be adhered to the metal blank with no primer layer between the polyester film and the metal blank. This, however, is not to exclude the provision of the primer layer but, as required, a known primer for adhesion can be provided. The primer for adhesion exhibits excellent adhesiveness to both the metal blank and the film. As the primer coating material exhibiting excellent adhesiveness and corrosion resistance, there can be exemplified a phenol epoxy coating material comprising a bisphenol epoxy resin and a resol-type phenolaldehyde resin derived from various phenols and formaldehyde. In particular, there can be exemplified a coating material containing the phenol resin and the epoxy resin at a weight ratio of from 50:50 to 1:99 and, particularly, from 40:60 to 5:95. The adhesive primer layer is usually formed maintaining a thickness of from 0.01 to 10 μM. The adhesive primer layer may be formed on the metal blank in advance, or may be formed on the polyester film.

Metal Can and its Production

The metal can using the resin-coated metal sheet of the present invention can be produced by any can-producing method so far as it is made of the above-mentioned resin-coating metal sheet. The metal can may be a three-piece can having a seam on the side surface but is usually a seamless can (two-piece can). The seamless can is produced by subjecting the above-mentioned resin-coated metal sheet to widely known means such as draw/redraw working, bend-elongation working (stretch working) based on draw/redraw working, bend-elongation/ironing working based on draw/redraw working, or draw/ironing working, in a manner that the polyester composition of the resin-coated metal sheet becomes the inside of the can.

The metal can according to the present invention is produced by the above-mentioned means. Preferably, the thickness of the side wall portion is decreased by the bend-elongation based on the redrawing and/or by the ironing.

As compared to the bottom portion, it is desired that the thickness of the side wall is decreased by the bend-elongation and/or by the ironing to assume a thickness which is from 20 to 95% and, particularly, from 30 to 85% of the blank thickness of the resin-coated metal sheet.

When, for example, the bend-elongation based on the draw/redraw working is employed, a pre-drawn cup is molded by drawing the resin-coated metal sheet at a drawing ratio in a range of from 1.1 to 3.0, redrawing the cup by using a redrawing punch and a redrawing die at a drawing ratio in a range of from 1.5 to 5.0, and effectively decreasing the thickness by bend-elongating the can by setting the radius (Rd) of curvature of the working corner of the redrawing die to be from 1 to 2.9 times and, particularly, from 1.5 to 2.9 times as large as the thickness (tB) of the metal blank, eliminating a change in the thickness between the upper part and the lower part of the side wall, and evenly decreasing the thickness over the whole side wall.

In general, the thickness of the side wall of the barrel can be decreased to be not larger than 80%, or not larger than 45% and, particularly, not larger than 50% of the blank thickness (tB).

In the above redraw working, further, the side wall can be subjected to the ironing by arranging an ironing unit behind the bend-elongation working unit of the redrawing die.

It is desired that the thickness reduction ratio RI as defined by the following formula, $$RI = \{(tB - tW)/tB\} \times 100 \quad (2)$$

wherein tB is a thickness of the blank, and tW is a thickness of the side wall, of from 20 to 95% and, particularly, from 30 to 85%, is accomplished through the bend-elongation working and the ironing.

The can that is obtained is subjected to at least one stage of heat treatment to remove residual strain in the film caused by the working, to evaporate the lubricant used for the working from the surfaces thereof, and to dry and cure the printing ink printed on the surfaces. The container after the heat treatment is quickly cooled or is left to cool and, then, as required, subjected to the necking of one stage or of a plurality of stages, followed by flanging to obtain a can for wrap-seaming.

Can Closure and its Production

The can closure of the resin-coated metal sheet of the present invention can be produced by any conventional closure production method so far as it is made of the above-mentioned resin-coated metal sheet. Generally, the invention is applied to easy-to-open closures of the stay-on-tub type and to easy-to-open closures of the fully opening type.

EXAMPLES

The invention will now be described by way of Examples.

Preparation of the Resin-coated Metal Sheet

In Examples 1 to 6, 12 to 17 and in Comparative Examples 1 to 6, the copolymerized or blended polyester resins shown in Table 1, and the ethylene polymers shown in Table 2, as well as a tocopherol (IRGANOX E201 produced by Chiba Specialty Chemicals Co.) were mixed in advance by using the Henschel's mixer to obtain compositions as shown in Table 3. The compositions were then pulverized by using a pin mill, thrown into a biaxial extruder and melt-kneaded therein, passed through a T-die so as to be extruded into films maintaining a thickness of 20 μm, which were then cooled through a cooling roll and were taken up to obtain cast films. Here, the temperature conditions were selected to be optimum for each of the resins.

In Example 13, however, the resin shown in Table 3 was used as a lower layer, the polyester resin B shown in Table 1 was used as the surface layer, and a two-layer cast film was prepared having a surface layer of 5 μm thick and a lower layer of 15 μm thick by using two biaxial extruders and a two-layer T-die.

In Examples 1 to 6, 12 to 15 and in Comparative Examples 1 to 4, the thus prepared cast films were heat-laminated on both surfaces of TFS steel sheets (sheet thickness of 0.18 mm, amount of metal chromium of 120 mg/m$^2$, amount of chromium oxide hydrate of 15 mg/m$^2$), and were immediately cooled with water to obtain resin-coated metal sheets. Here, the temperature of the metal sheets of before being laminated was set to be higher than the melting point of the polyester resin by 15° C. The lamination was effected by maintaining the laminate roll at a temperature of 150° C. and by passing the sheet at a rate of 40 m/min.

In Example 16 and in Comparative Example 5, the resin-coated metal sheets were obtained in the same manner as in Examples 1 to 6, 12 to 15 and as in Comparative Examples 1 to 4 but using the aluminum alloy sheet (A3004H39) having a sheet thickness of 0.24 mm.

In Examples 17 and in Comparative Example 6, the resin-coated metal sheets were obtained in the same manner as in Examples 1 to 6, 12 to 15 and as in Comparative Examples 1 to 4 but using the aluminum alloy sheet (A5052H38) having a sheet thickness of 0.25 mm.

In Examples 7 to 11, resins (tocopherol was IRGANOX E217DF produced by Chiba Specialty Chemicals Co.) of compositions shown in Table 3 were dry-blended on the TFS steel sheets (sheet thickness of 0.18 mm, amount of metal chromium of 20 mg/$M^2$, amount of chromium oxide hydrate of 15 mg/$M^2$) heated at 250° C., supplied to an extruder of a diameter of 65 mm equipped with an extrusion-lamination facility, melt-extruded maintaining a thickness of 20 $\mu$m and was laminated on one surface of TFS which was the outer surface. Then, the same resin component was supplied into an extruder of a diameter of 65 mm equipped with an extrusion-lamination facility, and was melt-extruded maintaining a thickness of 20 $\mu$m and was laminated on the other surface which was the inner surface while heating the sheet at a temperature lower than the melting point of the resin by 30° C. thereby to obtain a resin-coated metal sheet.

In Example 18 and in Comparative Examples 7 to 11, the polyester resins shown in Table 4 as first components, and the ionomer resins shown in Table 5 as second components, were thrown into a biaxial extruder so as to obtain the compositions shown in Table 6, and were melt-kneaded, passed through a T-die and were extruded maintaining a thickness of 30 aim, and were cooled through a cooling roll to obtain films which were, then, taken up as cast films. Here, the temperature conditions were selected to be optimum for each of the resins.

In Example 18, however, the tocopherol was added as a third component in an amount of 1% by weight.

In Example 18 and in Comparative Examples 7 to 9, the thus prepared cast films were heat-laminated on both surfaces of TFS steel sheets (sheet thickness of 0.18 mm, amount of metal chromium of 120 mg/$m^2$, amount of chromium oxide hydrate of 15 mg/$m^2$), and were immediately cooled with water to obtain resin-coated metal sheets. Here, the temperature of the metal sheets of before being laminated was set to be higher than the melting point of the polyester resin by 15° C. The lamination was effected by maintaining the laminate roll at a temperature of 150° C. and by passing the sheet at a rate of 40 m/min.

Evaluation was conducted as described below.

In Examples 19 to 21 and in Comparative Example 12, the polyethylene terephthalates modified with 5 mol % of isophthalic acid, as well as the ethylene copolymers of compositions shown in Table 7 and a tocopherol (IRGANOX E201 produced by Chiba Specialty Chemicals Co.) were mixed in advance by using the Henschel's mixer to obtain compositions as shown in Table 8. The compositions were then pulverized by using a pin mill, thrown into a biaxial extruder and melt-kneaded therein, passed through a T-die so as to be extruded into a film maintaining a thickness of 20 $\mu$m, which were then cooled through a cooling roll and were taken up to obtain cast films. Here, the temperature conditions were selected to be optimum for each of the resins. Thereafter, the thus prepared cast films were heat-laminated on both surfaces of TFS steel sheets (sheet thickness of 0.18 mm, amount of metal chromium of 120 mg/$m^2$, amount of chromium oxide hydrate of 15 mg/$m^2$), and were immediately cooled with water to obtain laminates. Here, the temperature of the metal sheets of before being laminated was set to be higher than the melting point of the polyester resin by 15° C. The lamination was effected by maintaining the laminate roll at a temperature of 150° C. and by passing the sheet at a rate of 40 m/min.

Flat Sheet dent ERV Testing

The coated surface to be evaluated of the resin-coated metal sheet was brought into contact with a silicon rubber having a thickness of 3 mm and a hardness of 50° at 5° C. under wet condition. A steel ball of a diameter of ⅝ inches was placed on the side opposite thereto with the metal sheet sandwiched therebetween. A weight of 1 kg was fallen from a height of 40 mm to shock-stretch the metal sheet.

The degree of cracks in the resin film on the shocked portion was measured with an electric current maintaining a voltage of 6.00 V. The exposure of metal due to the shock was evaluated based on an average of six values.

The results of evaluation were represented by:

◯: Average electric current<0.1 mA.

X: Average electric current>0.1 mA.

Adhesion Testing

The resin-coated metal sheet was rolled until the thickness was 50% of the initial thickness, and was cut in a crossing manner by using a cutter knife. A cellophane tape (24 mm manufactured by Nichiban Co.) was stuck on the cut portion and was peeled therefrom.

The resin film remaining after the cellophane tape has been peeled off was evaluated.

The results of evaluation were represented by;

◯: The film was not peeled off.

X: The film was peeled off.

Cross-cut Testing

An upper part of the can wall measuring 3 cm×3 cm was cut out from the metal can that was obtained, cut in a crossing manner by using a cutter knife, immersed in an aqueous solution containing 0.1% of sodium chloride, and was left to stay therein at 50° C. for one week to observe the corroded state. Peeling of the film off the cross-cut portion and the degree of corrosion under the film were evaluated.

The results of evaluation were represented by;

◯: Peeling of film or corrosion under the film is smaller than 1 mm.

X: Peeling of film or corrosion under the film is larger than 1 mm.

Retort Testing

Distilled water was poured at 95° C., retort treatment was conducted at 135° C. for 30 minutes, the temperature was returned to room temperature and distilled water was drained off. In the case of the metal can, the inner surface of the can was observed and evaluated for its corrosion. In the case of the closure, the inner surface of the closure was observed and evaluated for its corrosion.

The results of evaluation were represented by;

◯: Corrosion was not observed at all.

X: Abnormal condition such as corrosion was observed.

Package Testing

The metal can was evaluated as described below. Namely, the can filled with the Coke was laid and was left to stand still. A ball of a diameter of 65.5 mm weighing 1 kg was fallen on the can at an end on the side of the bottom of the neck-worked portion of the can on an axis at right angles with the direction of rolling the metal sheet at a temperature of 5° C. Then, the can was preserved at 37° C. for one year and, then, the inner surface of the can was observed.

Further, the closure was evaluated as described below. Namely, the can filled with the Coke was preserved at 37° C. for one year and, then, the inner surface of the closure was observed.

Melt Viscosity

The metal was dissolved from the resin-coated metal sheet to isolate the film, followed by vacuum-drying for at least 24 hours to obtain a sample. The melt viscosity was measured at 260° C., 122 sec$^{-1}$ by using a Capillograph (manufactured by Toyo Seiki Co.).

IV (Inherent Viscosity)

The metal was dissolved from the resin-coated metal sheet to isolate the film, followed by vacuum-drying for at least 24 hours to obtain a sample. 200±0.2 Milligrams of the sample was weighed, added into 20 ml of a mixed solvent of phenol and a 1,1,2,2-tetrachloroethane at a weight ratio of 1:1, dissolved in an oil bath heated at 130° C. for about 30 minutes with stirring, and was left to cool down to room temperature. The solution cooled down to room temperature was passed through a glass filter, and was poured into the Ubbelohde's viscometer secured in a water vessel maintained at 30±0.1° C. constant. After the temperature has been stabilized, the falling time was measured three times. The results measured according to the above method was substituted for the following formula, and the calculated results were regarded to be IVs (inherent viscosities).

$$[\eta] = \frac{-1 + \sqrt{1 + 4k'\eta_{sp}}}{2k'C} \qquad \eta_{sp} = \frac{\tau - \tau_0}{\tau_0} \quad \text{wherein:}$$

[η]: IV (inherent viscosity, dl/g)

$\eta_{sp}$: specific viscosity k': Huggins' constant (=0.33)

C: concentration (g/dl)

τ: falling time of the solution (sec)

$\tau_0$: falling time of the solvent (sec)

Diameter of the Dispersed Particles

The metal was dissolved from the resin-coated metal sheet to isolate the film, followed by vacuum-drying for at least 24 hours to obtain a sample which was then immersed in xylene (maintained at 60° C.) for one minute. Thereafter, the sample was dried in open air and the surface thereof was observed by using a scanning electron microscope. The particle diameter was found by measuring the areas of particles in a photograph, calculating the diameters corresponding to true circles having such areas for at least 100 or more arbitrary particles, and averaging the results.

Can Denting Test

The metal can was retort-treated according to the same procedure as the retort corrosion testing, and was preserved in a constant-temperature chamber maintained at 37° C. for one month. Then, a steel ball having a diameter of ⅝ inches was placed on the side wall, and a weight of 1 kg was fallen from a height of 40 mm to shock-stretch the metal sheet. Thereafter, the distilled water was drained off, and the degree of cracks in the resin coating on the shocked portion was evaluated relying upon an electric current by applying a voltage of 6.00 V to the shocked portion.

Examples 1 to 15

The obtained resin-coated metal sheets were put to the flat sheet dent ERV testing and to the adhesion testing. The results were as shown in Table 3. Every resin-coated metal sheet exhibited excellent dent resistance and adhesiveness.

A wax-type lubricant was applied to the resin-coated metal sheets from which disks having a diameter of 166 mm were obtained by punching to form shallow-draw-formed cups. The shallow-draw-formed cups were then subjected to the redraw/ironing working to obtain deep-draw-ironed cups.

The deep-draw-formed cups possessed the following properties.

| | |
|---|---|
| Diameter of cup: | 66 mm |
| Height of cup: | 128 mm |
| Thickness of can wall to the blank thickness: | 65% |
| Thickness of flange to the blank thickness: | 77% |

The deep-draw-ironed cups were subjected to the doming according to the customary manner and were heat-treated at 220° C. The cups were, then, left to cool, the edges of the opening thereof were trimmed, the curved surfaces thereof were printed, baked and dried. The cups were then subjected to the necking and flanging to obtain seamless cans for a content of 350 g. No problem was involved during the formation.

The cans were subjected to the cross-cut testing, package testing and retort-treatment testing by being filled with distilled water.

Favorable results were obtained as shown in Table 3 without corrosion in the cross-cut testing, without corrosion in the dented portion in the package testing and without corrosion in the retort testing. From these results, the seamless cans that were obtained were evaluated to be excellently suited for preserving beverages.

Example 16

The obtained resin-coated metal sheet was put to the flat sheet dent ERV testing and to the adhesion testing. The results were as shown in Table 3. The resin-coated metal sheet exhibited excellent dent resistance and adhesiveness.

A wax-type lubricant was applied to the resin-coated metal sheet from which a disk having a diameter of 166 mm was obtained by punching to form a shallow-draw-formed cup. The shallow-draw-formed cup was then subjected to the redraw/ironing working to obtain a deep-draw-ironed cup.

The deep-draw-formed cup possessed the following properties.

| | |
|---|---|
| Diameter of cup: | 66 mm |
| Height of cup: | 127 mm |
| Thickness of can wall to the blank thickness: | 45% |
| Thickness of flange to the blank thickness: | 77% |

The deep-draw-ironed cup was subjected to the doming according to the customary manner and was heat-treated at 220° C. The cup was, then, left to cool, the edges of the opening thereof were trimmed, the curved surface thereof was printed, baked and dried. The cup was then subjected to the necking and flanging to a obtain seamless can for a content of 350 g. No problem was involved during the formation.

The can was subjected to the cross-cut testing, package testing and retort-treatment testing by being filled with distilled water.

Favorable results were obtained as shown in Table 3 without corrosion in the cross-cut testing, without corrosion in the dented portion in the package testing and without corrosion in the retort testing. From these results, the seamless can that was obtained was evaluated to be excellently suited for preserving beverages.

Example 17

The obtained resin-coated metal sheet was put to the flat sheet dent ERV testing and to the adhesion testing. The results were as shown in Table 3. The resin-coated metal sheet exhibited excellent dent resistance and adhesiveness.

From the resin-coated metal sheet was then obtained by punching a closure having a diameter of 68.7 mm in such a manner that the resin-coated surface was on the inside of the closure. The outer surface of the closure was, then, subjected to the partially opened scoring (width of 22 mm, remaining thickness after scoring of 110 μm, scoring width of 20 μm), rivetting, and to which a tab for opening was attached thereby to obtain an SOT closure. No problem was involved during the formation.

The package testing and retort resistance testing were conducted by using the thus obtained SOT closure. No corrosion was recognized, and the closure was evaluated to be excellently used for the metal cans.

Comparative Examples 1 to 4

The obtained resin-coated metal sheets were put to the flat sheet dent ERV testing and to the adhesion testing. The results were as shown in Table 3. The corrosion resistance, dent resistance and adhesiveness were inferior to those of Examples.

It was attempted to produce the seamless cans by using these resin-coated metal sheets under the same conditions as those of Examples 1 to 15. While deep-drawing the cups, however, the film was broken and peeled off, and the seamless cans could not be obtained. Even if they could be obtained, corrosion occurred in the cross-cut testing, corrosion developed in the package testing, and corrosion took place in the retort testing. Because of these results, the obtained seamless cans were evaluated to be not suited for preserving beverages.

Comparative Example 5

The obtained resin-coated metal sheet was put to the flat sheet dent ERV testing and to the adhesion testing. The results were as shown in Table 3. The corrosion resistance, dent resistance and adhesiveness were inferior to those of Examples.

It was attempted to produce the seamless cans by using these resin-coated metal sheet under the same conditions as those of Example 16. No problem was involved during the formation.

Then, the seamless can was put to the cross-cut testing, package testing and retort-treatment testing by being filled with distilled water.

As shown in Table 3, corrosion occurred in the cross-cut testing, corrosion developed in the package testing, and corrosion took place in the retort testing. Because of these results, the obtained seamless can was evaluated to be not suited for preserving beverages.

Comparative Example 6

The obtained resin-coated metal sheet was put to the flat sheet dent ERV testing and to the adhesion testing. The results were as shown in Table 3. The adhesiveness was inferior to that of Examples.

It was attempted to produce the SOT closure in the same manner as in Example 17. As a result, the film cracked on the scored portion. Further, corrosion occurred in the package testing and in the retort testing. The closure, therefore, was evaluated to be not suited for use with the metal cans.

Example 18

The obtained resin-coated metal sheet was put to the flat sheet dent ERV testing. The results were as shown in Table 6. The resin-coated metal sheet exhibited excellent dent resistance.

A wax-type lubricant was applied to these resin-coated metal sheet from which a disk having a diameter of 140 mm was obtained by punching followed by drawing to form a draw-formed cup. The draw-formed cup was then subjected to the bend-elongation/ironing working twice to obtain a seamless cup.

The seamless cup possessed the following properties.

| | |
|---|---|
| Diameter of cup: | 52 mm |
| Height of cup: | 141 mm |
| Thickness of can wall to the blank thickness: | 37% |
| Thickness of a portion corresponding to the flange with respect to the blank thickness: | 69% |

The seamless cup was subjected to the bottom-formation processing according to the customary manner and was beat-treated at 220° C. The cup was, then, left to cool, the edges of the opening thereof were trimmed, the curved surface thereof was printed, baked and dried. The cup was then subjected to the necking and flanging to obtain a seamless can having a content of 250 ml. No problem was involved during the formation.

The can was subjected to the retort-treatment testing by being filled with distilled water and to the denting testing.

As shown in Table 6, no corrosion occurred in the retort testing. Further, good results were obtained in the denting testing. From these results, the seamless can was evaluated to be excellently used for preserving beverages.

Comparative Examples 7 to 9

The obtained resin-coated metal sheets were put to the flat sheet dent ERV testing and to the adhesion testing. The results were as shown in Table 6. The dent resistance was inferior to that of Examples.

By using the resin-coated metal sheets, seamless cans were produced under the same conditions as in Example 18. No problem was involved during the formation.

Then, the seamless cans were put to the retort testing by being filled with distilled water and to the denting testing.

As shown in Table 6, corrosion occurred in the retort testing. The results of the denting testing were inferior, either. Because of these results, the obtained seamless cans were evaluated to be not suited for preserving beverages.

Comparative Example 10

It was attempted to form a film of a resin as shown in Table 6. Due to the torque over of the extruder, however, the film could not be formed. Therefore, the results could not be evaluated.

Examples 19 to 21

The obtained laminates were put to the flat sheet dent ERV testing and to the adhesion testing. The results were as shown in Table 8. Every laminate exhibited excellent dent resistance and adhesiveness.

A wax-type lubricant was applied to laminates from which disks having a diameter of 166 mm were obtained by punching to form shallow-draw-formed cups. The shallow-draw-formed cups were then subjected to the redraw/ironing working to obtain deep-draw-ironed cups.

The deep-draw-formed cups possessed the following properties.

| | |
|---|---|
| Diameter of cup: | 66 mm |
| Height of cup: | 128 mm |
| Thickness of can wall to the blank thickness: | 65% |
| Thickness of flange to the blank thickness: | 77% |

The deep-draw-ironed cups were subjected to the doming according to the customary manner and were heat-treated at 220° C. The cups were, then, left to cool, the edges of the openings thereof were trimmed, the curved surfaces thereof were printed, baked and dried. The cups were then subjected to the necking and flanging to obtain seamless cans for a content of 350 g. No problem was involved during the formation.

The cans were subjected to the package testing and retort-treatment testing by being filled with distilled water.

Favorable results were obtained as shown in Table 8 without corrosion in the dented portion in the package testing and without corrosion in the retort testing. From these results, the obtained seamless cans were evaluated to be excellently suited for preserving beverages.

Comparative Example 12

The obtained laminate was put to the flat sheet dent ERV testing and to the adhesion testing. The results were as shown in Table 3. The dent resistance and adhesiveness were inferior to those of Examples.

It was attempted to produce the seamless can by using the laminate under the same conditions as those of Examples 19 to 21. While deep-drawing the cups, however, the film was peeled off, and the seamless can was not obtained and could not be evaluated.

TABLE 1

| | | (Polyester resins) | | | |
|---|---|---|---|---|---|
| | | Polyester 1 | | Polyester 2 | Blending |
| Name of composition | Copolymerizable component | Ratio of copolymerization (mol %) | Copolymerizable component | Ratio of copolymerization (mol %) | ratio of polyester 1/ polyester 2 (weight ratio) |
| A | none | 0 | | | |
| B | isophtharic acid | 5 | | | |
| C | isophtharic acid | 15 | | | |
| D | none | 0 | naphthalene dicarboxylic acid | 92 | 80/20 |

TABLE 1-continued

(Polyester resins)

| | Polyester 1 | | Polyester 2 | | Blending |
|---|---|---|---|---|---|
| Name of composition | Copolymerizable component | Ratio of copolymerization (mol %) | Copolymerizable component | Ratio of copolymerization (mol %) | ratio of polyester 1/ polyester 2 (weight ratio) |
| E | cyclohexane dimethanol | 5 | | | |

TABLE 2

(Ethylene polymers)

| Name of composition | Kind | Trade name and grade | Manufacturer |
|---|---|---|---|
| A | ionomer | Himilan #1557 | Mitsui-du Pont Polychemicals Co. |
| B | ionomer | Himilan #1707 | Mitsui-du Pont Polychemicals Co. |
| C | ethylene/methacrylic acid copolymer | Nukrel N1108C | Mitsui-du Pont Polychemicals Co. |
| D | ethylene/acrylic acid copolymer | Primacol #3330 | Dow Chemical Nihon Co. |
| E | ethylene/methyl methacrylate copolymer | Akrift WK307 | Sumitomo Kagaku Kogyo Co. |
| F | ethylene/octene-1 copolymer | Affinity PL1840 | Dow Chemical Nihon Co. |

TABLE 3

(Resin-coated metal sheets and evaluation)

| | Polyester | | Ethylene polymer | | Tocopherol Amount (% by wt.) | Substrate | Flat sheet dent ERV test | Adhesion | Moldability | | Cross-cut test Corrosion | Package test corrosion | Retort test corrosion |
|---|---|---|---|---|---|---|---|---|---|---|---|---|---|
| | Kind | Amount (% by wt.) | Kind | Amount (% by wt.) | | | | | Object | Result | | | |
| Ex.1 | A | 80 | A | 19.9 | 0.1 | TFS | ○ | ○ | can | good | ○ | no | no |
| Ex.2 | A | 80 | A | 19.0 | 1.0 | TFS | ○ | ○ | can | good | ○ | no | no |
| Ex.3 | A | 80 | A | 18.5 | 1.5 | TFS | ○ | ○ | can | good | ○ | no | no |
| Ex.4 | A | 80 | A | 17.5 | 2.5 | TFS | ○ | ○ | can | good | ○ | no | no |
| Ex.5 | A | 90 | A | 9.0 | 1.0 | TFS | ○ | ○ | can | good | ○ | no | no |
| Ex.6 | A | 60 | A | 39.0 | 1.0 | TFS | ○ | ○ | can | good | ○ | no | no |
| Ex.7 | A | 80 | B | 19.0 | 1.0 | TFS | ○ | ○ | can | good | ○ | no | no |
| Ex.8 | A | 80 | C | 19.0 | 1.0 | TFS | ○ | ○ | can | good | ○ | no | no |
| Ex.9 | A | 80 | D | 19.0 | 1.0 | TFS | ○ | ○ | can | good | ○ | no | no |
| Ex.10 | A | 80 | A/E = 1/1 blend (wt ratio) | 19.0 | 1.0 | TFS | ○ | ○ | can | good | ○ | no | no |
| Ex.11 | A | 80 | A/F = 1/1 blend (wt ratio) | 19.0 | 1.0 | TFS | ○ | ○ | can | good | ○ | no | no |
| Ex.12 | B | 80 | A | 19.0 | 1.0 | TFS | ○ | ○ | can | good | ○ | no | no |
| Ex.13 | C | 80 | A | 19.0 | 1.0 | TFS | ○ | ○ | can | good | ○ | no | no |
| Ex.14 | D | 80 | A | 19.0 | 1.0 | TFS | ○ | ○ | can | good | ○ | no | no |
| Ex.15 | E | 80 | A | 19.0 | 1.0 | TFS | ○ | ○ | can | good | ○ | no | no |
| Ex.16 | B | 80 | A | 19.0 | 1.0 | Al | ○ | ○ | can | good | ○ | no | no |
| Ex.17 | B | 80 | A | 19.0 | 1.0 | Al | ○ | ○ | bottle | good | — | no | no |
| C.Ex.1 | A | 80 | A | 20.0 | 0.0 | TFS | ○ | X | can | good | X | corroded | corroded |
| C.Ex.2 | A | 80 | A | 16.5 | 3.5 | TFS | ○ | X | can | good | X | corroded | corroded |
| C.Ex.3 | A | 99 | A | 0.0 | 1.0 | TFS | X | X | can | broken | — | — | — |
| C.Ex.4 | A | 45 | A | 54.0 | 1.0 | TFS | ○ | X | can | broken | — | — | — |

TABLE 3-continued (Resin-coated metal sheets and evaluation)

| | Polyester | | Ethylene polymer | | Toco-pherol | | Flat sheet | | | Moldability | | Cross-cut test Corro-sion | Package test corro-sion | Retort test corro-sion |
|---|---|---|---|---|---|---|---|---|---|---|---|---|---|---|
| | Kind | Amount (% by wt.) | Kind | Amount (% by wt.) | Amount (% by wt.) | Sub-strate | dent ERV test | Adhe-sion | Object | Result | | | | |
| C.Ex.5 | B | 80 | A | 20.0 | 0.0 | Al | ○ | X | can | good | | X | corroded | corroded |
| C.Ex.6 | B | 80 | A | 20.0 | 0.0 | Al | ○ | X | bottle | cracked | | — | corroded | corroded |

TABLE 4

(Polyester resin)

| Name of composition | Inherent viscosity | Copolymerizable component | Ratio of copolymerization |
|---|---|---|---|
| A | 0.58 | none | 0 |
| B | 0.72 | none | 0 |
| C | 0.85 | none | 0 |
| D | 0.90 | isophthalic acid | 5 |
| E | 1.55 | none | 0 |

TABLE 5

(Ionomer resin)

| Name of composition | Melt flow rate | Melting point |
|---|---|---|
| A | 0.9 | 88 |
| B | 5.0 | 91 |
| C | 14.0 | 90 |

TABLE 6

(Coated resin)

| | Poly-ester | Ionomer Kind | Amount (% by wt.) | IV (dl/g) | Melt viscos-ity (poise) | Diameter of dispersed particles ($\mu$m) | Film-forming proper-ty | Flat sheet dent (mA) | Retort resist-ance | Can dent-ing (mA) | Remarks |
|---|---|---|---|---|---|---|---|---|---|---|---|
| Ex.18 | D | B | 15 | 0.80 | 6200 | 0.7 | ○ | <0.1 | ○ | 0.1 | 1 wt % tocopheral added |
| Comp. Ex.7 | A | A | 5 | 0.55 | 1700 | 5.8 | X | 2.3 | X | 3.3 | |
| Comp. Ex.8 | A | C | 15 | 0.53 | 1500 | 8.7 | X | 3.1 | X | 3.7 | |
| Comp. Ex.9 | B | — | 0 | 0.69 | 4300 | — | X | 3.5 | X | 5.1 | |
| Comp. Ex.10 | E | — | 0 | — | — | — | — | — | — | — | torque over of extruder |

TABLE 7

| Name of composition | Kind | Grade | Melt flow rate | Manufacturer |
|---|---|---|---|---|
| A | ionomer | Himilan #1706 | 0.9 | Mitsui-du Pont Polychemicals Co. |
| B | ethylene/butene copolymer | EBM 2021P | 1.3 | Nihon Gosei Gomu Co. |

(Ethylene polymers)

TABLE 8

| | Polyester Amount (% by wt) | Ethylene polymer A Amount (% by wt) | Ethylene polymer B Amount (% by wt) | Tocopherol Amount (% by wt) | Substrate | Flat sheet dent ERV test | Adhesion | Moldability Object | Moldability Result | Cross-cut test corrosion | Package test corrosion | Retort test corrosion |
|---|---|---|---|---|---|---|---|---|---|---|---|---|
| Ex.19 | 80 | 10 | 10 | 0.5 | TFS | ○ | ○ | can | good | ○ | no | no |
| Ex.20 | 95 | 1.0 | 4.0 | 0.5 | TFS | ○ | ○ | can | good | ○ | no | no |
| Ex.21 | 50 | 25 | 25 | 0.5 | TFS | ○ | ○ | can | good | ○ | no | no |
| Comp. Ex.12 | 40 | 50 | 10 | 0.5 | TFS | X | X | can | peeled | — | — | — |

What is claimed is:

1. A resin-coated metal sheet comprising a metal substrate and a thermoplastic resin layer formed on the surface of said metal substrate, wherein said thermoplastic resin layer comprises a polyester consisting essentially of a polyethylene terephthalate and an ethylene polymer, and contains a tocopherol or a derivative thereof in an amount of from 0.05 to 3% by weight, said resin layer has a melt viscosity of from 2000 to 10.000 centipoises at a temperature of 260° C. and at a shearing rate of 122 sec$^{-1}$, the polyester in the resin layer has an inherent viscosity (IV) in a range of from 0.6 to 1.5, and the ethylene polymer in said resin layer exists as a dispersion phase having an average particle diameter of not larger than 5 µm.

2. A resin-coated metal sheet ac-cording to claim 1, wherein said polyester and said ethylene polymer are contained at a weight ratio of from 95:5 to 50:50.

3. A resin-coated metal sheet according to claim 1, wherein the ethylene polymer contains an ionomer resin.

4. A resin-coated metal sheet according to claim 3, wherein the ionomer resin in said resin layer contains zinc as a metal seed.

5. A resin-coated metal can obtained by molding a resin-coated metal sheet as claimed in claim 1 in such a manner that the coated layer becomes the inner surface of the can.

6. A resin-coated metal closure obtained by molding a resin-coated metal sheet as claimed in claim 1 in such a manner that the coated layer becomes the inner surface of the can closure.

* * * * *